(12) United States Patent
Nagao et al.

(10) Patent No.: US 9,199,578 B2
(45) Date of Patent: Dec. 1, 2015

(54) TONNEAU COVER DEVICE

(75) Inventors: Takashi Nagao, Aichi (JP); Hiroyuki Mori, Nagoya (JP); Zhengtai Yu, Nagoya (JP)

(73) Assignees: KABUSHIKI KAISHA TOKAI RIKA DENKI SEISAKUSHO, Aichi (JP); HAYASHI TELEMPU CO., LTD., Aichi-Ken (JP)

( * ) Notice: Subject to any disclaimer, the term of this patent is extended or adjusted under 35 U.S.C. 154(b) by 213 days.

(21) Appl. No.: 14/006,800

(22) PCT Filed: Mar. 23, 2012

(86) PCT No.: PCT/JP2012/002025
§ 371 (c)(1),
(2), (4) Date: Sep. 23, 2013

(87) PCT Pub. No.: WO2012/132365
PCT Pub. Date: Apr. 10, 2012

(65) Prior Publication Data
US 2014/0015276 A1    Jan. 16, 2014

(30) Foreign Application Priority Data

Mar. 30, 2011  (JP) ................................. 2011-075517

(51) Int. Cl.
*B60R 5/04* (2006.01)
(52) U.S. Cl.
CPC ..................................... *B60R 5/047* (2013.01)
(58) Field of Classification Search
CPC ............ B60R 25/10; B60R 5/04; B60R 5/047
USPC ................. 296/66, 68.1, 65.09, 37.16, 24.43, 296/24.44, 37.5, 56, 57.1, 146.8; 340/426.29
See application file for complete search history.

(56) References Cited

U.S. PATENT DOCUMENTS 6,930,592 B2 * 8/2005 Schlecht et al. .......... 340/426.29
7,537,265 B2 * 5/2009 Hori et al. ................ 296/100.15
(Continued)

FOREIGN PATENT DOCUMENTS

| CN | 101184652 | 5/2008 |
| DE | 102005055625 | 5/2007 |

(Continued)

OTHER PUBLICATIONS

Japan Office action, mail date is May 27, 2014.
(Continued)

*Primary Examiner* — Jason S Morrow
*Assistant Examiner* — E Turner Hicks
(74) *Attorney, Agent, or Firm* — Greenblum & Bernstein P.L.C.

(57) ABSTRACT

A tonneau cover device moves a tonneau cover, which is coupled to a hatchback door of a vehicle, between an extension position and a storage position. The tonneau cover device includes a detection unit and a controller. The detection unit detects whether a pre-operation for opening the hatchback door has been performed. The controller permits movement of the tonneau cover to the extension position when a courtesy switch, which is arranged in the vehicle, detects that the hatchback door is closed and the detection unit does not detect that the pre-operation has been performed. The controller restricts movement of the tonneau cover to the extension position when the courtesy switch detects that the hatchback door is closed and the detection unit detects that the pre-operation has been performed.

7 Claims, 4 Drawing Sheets

(56) References Cited

U.S. PATENT DOCUMENTS

| | | | |
|---|---|---|---|
| 7,621,577 B2 * | 11/2009 | Schlecht ................... 296/24.4 |
| 2008/0012374 A1 | 1/2008 | Hofmann |
| 2008/0277957 A1 | 11/2008 | Hirayama et al. |
| 2009/0058128 A1 | 3/2009 | Hirayama et al. |
| 2009/0115216 A1 | 5/2009 | Plettrichs et al. |
| 2012/0053785 A1 * | 3/2012 | Wittorf ........................ 701/36 |

FOREIGN PATENT DOCUMENTS

| | | | | |
|---|---|---|---|---|
| DE | 102006057668 | | 6/2008 |
| EP | 2030841 | | 3/2009 |
| JP | 2006-224712 | | 8/2006 |
| JP | 2008-037190 | | 2/2008 |
| JP | 2008-179322 | | 8/2008 |
| JP | 2010-012983 | | 1/2010 |
| JP | 2010-012984 | | 1/2010 |
| JP | 2010012983 A | * | 1/2010 |
| JP | 2011-42206 | | 3/2011 |

OTHER PUBLICATIONS

Japan Office action, mail date is Oct. 7, 2014.
U.S. Appl. No. 14/004,026 to Takashi Nagao et al., filed Sep. 9, 2013.
U.S. Appl. No. 14/006,779 to Shinichi Miyazaki et al., filed Sep. 23, 2013.
U.S. Appl. No. 14/003,101 to Takashi Nagao et al., filed Sep. 4, 2013.
International Search Report dated Jun. 28, 2012.
China Office action, dated Feb. 27, 2015 along with an English translation thereof.

* cited by examiner

Fig.4A

1st Embodiment

|  | Courtesy Switch 38 | Latch Switch 37 |
|---|---|---|
| Extension Starting Conditions (Door Closed) | ON → OFF | OFF |
| Storage Starting Conditions ((Door Open) | | OFF→ON (Engagement Position → Disengagement Position) |

Fig.4B

2nd Embodiment

|  | Courtesy Switch 38 | Unlock Switch 31 |
|---|---|---|
| Extension Starting Conditions (Door Closed) | ON → OFF | No ON Signal |
| Storage Starting Conditions ((Door Open) | | ON Signal Present |

Fig.4C

3rd Embodiment

|  | Courtesy Switch 38 | Electronic Key 10 |
|---|---|---|
| Extension Starting Conditions (Door Closed) | ON → OFF | No Unlocking Request Signal |
| Storage Starting Conditions ((Door Open) | | Unlocking Request Signal Present |

Fig.5

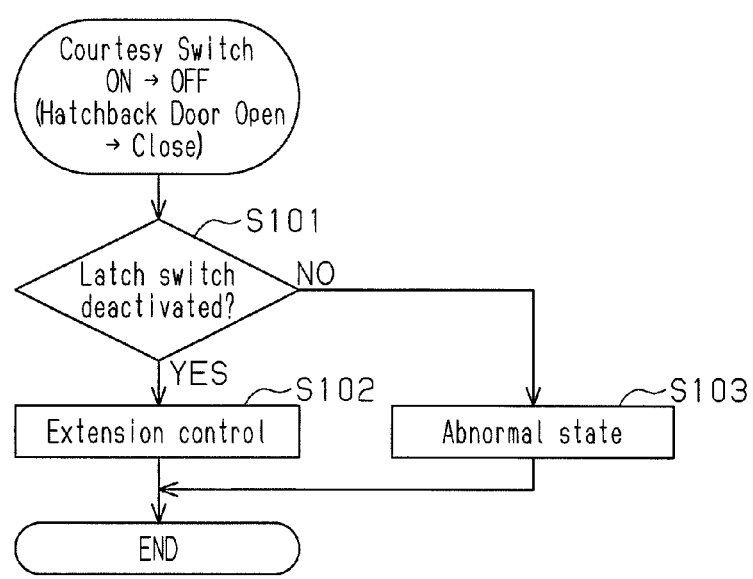

TONNEAU COVER DEVICE

FIELD

The present invention relates to a tonneau cover device that conceals a cargo compartment.

BACKGROUND

Tonneau cover devices are installed in vehicles to conceal cargo compartments. A tonneau cover device includes a hard or soft tonneau cover that moves in a horizontal direction of the vehicle above a cargo compartment. Japanese Laid-Open Patent Publication No. 2010-12984 describes an example of a tonneau cover device that electrically moves a tonneau cover. One example of a tonneau cover device in the related art will now be described with reference to FIG. 1. As shown in FIG. 1, the tonneau cover device includes a tonneau cover unit 40, which is arranged at the inner side of a hatchback door 45. The tonneau cover unit 40 includes a motor 41 serving as a driving unit, a tonneau cover 42, a roller 43, a case 46, two guides 48, and a link mechanism 49.

The roller 43 is rod-shaped. The roller 43 is supported by the case 46 to be rotatable about its axis, which extends in the lateral direction of the vehicle (direction orthogonal to the plane of FIG. 1). The tonneau cover 42 includes a basal end fixed to the circumferential surface of the roller 43. A spring (not shown) serving as a biasing member is attached to the roller 43 to bias it in a rotation direction in which the roller 43 rolls up the tonneau cover 42. Thus, the roller 43 rolls out the tonneau cover 42 while rotating against the biasing force of the spring.

Referring to FIG. 2, the link mechanism 49 is arranged under the tonneau cover 42. The link mechanism 49 is extended and retracted in the front to rear direction by the motor 41. The tonneau cover 42 includes a distal end fixed to the link mechanism 49. When the link mechanism 49 is extended by the motor 41 and the roller 43 rolls out the tonneau cover 42, the spring that biases the roller 43 applies tension to the tonneau cover 42. The link mechanism 49 includes distal members 49a, which project sideward from opposite sides of the distal end of the tonneau cover 42. The two guides 48 are arranged in a cargo compartment 50 of a vehicle and extend in the front to rear direction of the vehicle. The two guides 48 face each other in the lateral direction of the vehicle. When the motor 41 is driven in a state in which the hatchback door 45 is closed, the distal members 49a and the tonneau cover 42 move along the guides 48 in accordance with the extension and retraction of the link mechanism 49.

The distal end of the tonneau cover 42 moves between a storage position and an extension position. When in the storage position, the tonneau cover 42 is rolled up around the roller 43 and stored in the case 46. When in the extension position, the tonneau cover 42 is completely rolled out from the roller 43. In this state, the distal end of the tonneau cover 42 is arranged in the vicinity of the rear surface of a rear seat. When the tonneau cover 42 is located at the storage position, the cargo compartment 50 is exposed and visible from the exterior of the vehicle through a window glass 45a in the hatchback door 45. When the tonneau cover 42 is located at the extension position, the tonneau cover 42 conceals the cargo compartment 50.

In the tonneau cover device, the tonneau cover 42 moves in cooperation with the opening and closing of the hatchback door 45. The tonneau cover 42 moves from the storage position to the extension position when the hatchback door 45 closes and moves from the extension position to the storage position when the hatchback door 45 opens. The open and closed states of the hatchback door 45 may be detected by, for example, a courtesy switch. The courtesy switch is activated when the hatchback door 45 opens.

CITATION LIST

Patent Literature

[PTL 1]
Japanese Laid-Open Patent Publication No. 2010-12984

SUMMARY

A typical vehicle door includes a latch that is engaged with a door frame of the vehicle door. Thus, in the tonneau cover device, instead of the courtesy switch, the open state of a hatchback door may be detected based on the position of a latch arranged in the hatchback door. When a door open switch arranged at the outer side of the hatchback door is operated, the latch moves from an engagement position to a disengagement position. When the latch is located at the disengagement position, that is, when the latch is disengaged from the door frame, the hatchback door may be opened. A latch switch detects the location of the latch. The latch switch is deactivated when the latch is located at the engagement position and activated when the latch is located at the disengagement position.

When the latch switch is switched from a deactivated state to an activated state, the vehicle determines that the hatchback door will open and starts to execute a control for moving the tonneau cover to the storage position. Here, the courtesy switch would be activated when the hatchback door actually starts to open, whereas the latch switch is activated before the hatchback door actually starts to open. Accordingly, the use of the latch switch allows the tonneau cover to start moving to the storage position before the hatchback door opens. This readily moves the tonneau cover to the storage position.

However, the latch switch may fail to function normally and, for example, the latch switch may remain activated. In such a case, the state of the latch switch would not be switched even when the door open switch is operated. Thus, the tonneau cover would not move in cooperation with the opening of the hatchback door, and the tonneau cover would remain at the extension position even when the hatchback door opens. As the hatchback door 45 opens, the distal members 49a are separated from the guides 48. When the hatchback door 45 reaches a fully open position as shown by the broken lines in FIG. 1, the tonneau cover 42 is suspended from the hatchback door 45. In this state, due to interference caused by the tonneau cover 42 and the link mechanism 49, the hatchback door 45 may not be closed. Hence, before closing the hatchback door 45, the tonneau cover 42 has to be returned to the storage position. Otherwise, the distal members 49a have to be placed on the guides 48 before closing the hatchback door 45. Such tasks are burdensome.

Accordingly, it is an object of the present invention to provide a tonneau cover device with improved convenience.

One aspect of the present invention is a tonneau cover device including a tonneau cover coupled to an inner side of a hatchback door of a vehicle. The tonneau cover device electrically moves the tonneau cover between an extension position, at which the tonneau cover conceals a cargo compartment, and a storage position, at which the tonneau cover is separated from the cargo compartment. The vehicle includes a courtesy switch that detects opening and closing of the hatchback door. The tonneau cover device includes a detection unit that detects that the vehicle is in a first state when determining that a pre-operation for switching the hatchback door from a closed state to an open state has not been performed and detects that the vehicle is in a second state when determining that the pre-operation has been performed. A controller permits movement of the tonneau cover from the storage position to the extension position when the courtesy switch detects that the hatchback door is in the closed state and the detection unit detects that the vehicle is in the first state. Further, the controller restricts movement of the tonneau cover from the storage position to the extension position when the courtesy switch detects that the hatchback door is in the closed state and the detection unit detects that the vehicle is in the second state.

In this structure, when the courtesy switch detects that the hatchback door is closed and the detection unit detects the second state, the controller determines that an abnormality has occurred in the vehicle. In this case, the tonneau cover is not moved to the extension position and kept at the storage position. Even if the hatchback door opens in this state, the tonneau cover remains at the storage position. Accordingly, even when an abnormality occurs in the vehicle, the tonneau cover is not located at the extension position when the hatchback door is open.

In the tonneau cover device, the vehicle may include a latch arranged in the hatchback door. The latch is engaged with a door frame to close the hatchback door. A latch operation unit may be arranged at an outer side of the hatchback door. The latch operation unit is operated to shift the latch from an engagement position to a disengagement position. The latch is engaged with the door frame at the engagement position and disengaged from the door frame at the disengagement position thereby allowing for the hatchback door to open. A latch switch may detect whether the latch is located at the engagement position or the disengagement position. In this structure, the pre-operation is an operation of the latch operation unit. The detection unit detects that the vehicle is in the first state when the latch switch detects that the latch is located at the engagement position. Further, the detection unit detects that the vehicle is in the second state when the latch switch detects that the latch is located at the disengagement position.

In this structure, when the latch switch is in an abnormal state, the tonneau cover does not move to the extension position and remains at the storage position. Thus, the tonneau cover is not located at the extension position when the hatchback door is open.

In the tonneau cover device, the vehicle may include a door operation unit arranged outside the vehicle. Further, the vehicle may include a door control unit that unlocks a vehicle door when determining that a wireless signal transmitted from an electronic key carried by a user is valid and determining that the door operation unit has been operated. In this structure, the pre-operation is an operation of the door operation unit that requests unlocking of the vehicle door. The detection unit detects that the vehicle is in the second state when the detection unit receives a door unlock signal from the door operation unit.

In this structure, when the door operation unit is in an abnormal state, the tonneau cover does not move to the extension position and remains at the storage position. Thus, the tonneau cover is not located at the extension position when the hatchback door is open.

In the tonneau cover device, the vehicle may include a door control unit that unlocks a vehicle door when receiving an unlock request signal transmitted from an electronic key carried by a user. In this structure, the pre-operation is an operation of the electronic key for transmitting the unlock request signal. The detection unit detects that the vehicle is in the second state when receiving the unlock request signal from the electronic key.

In this structure, when the electronic key is in an abnormal state, the tonneau cover does not move to the extension position and remains at the storage position. Thus, the tonneau cover is not located at the extension position when the hatchback door is open.

In the tonneau cover device, the vehicle may include a tonneau cover switch operated when moving the tonneau cover between the storage position and the extension position. The controller moves the tonneau cover from the storage position to the extension position when the tonneau cover switch is operated in a state in which the tonneau cover is located at the storage position, the courtesy switch detects that the hatchback door is closed, and the detection unit detects that the vehicle is in the first state. Further, the controller keeps the tonneau cover at the storage position when the tonneau cover switch is operated in a state in which the tonneau cover is located at the storage position, the courtesy switch detects that the hatchback door is closed, and the detection unit detects that the vehicle is in the second state.

In this structure, the tonneau cover is controlled when the tonneau cover switch is operated. Accordingly, even when an abnormality occurs in the vehicle, the tonneau cover is not located at the extension position when the hatchback door is open.

In the tonneau cover device, when the detection unit detects that the vehicle has switched from the first state to the second state, the controller may determine that the hatchback door will be open and move the tonneau cover from the extension position to the storage position.

In this structure, as long as the pre-operation for switching the hatchback door from a closed state to an open state is detected, movement of the tonneau cover to the storage position is started. Accordingly, the tonneau cover starts to move to the storage position before the courtesy switch detects that the hatchback door is open, that is, before the hatchback door actually opens. This readily stores the tonneau cover and improves convenience for the user.

The tonneau cover device may include a roller, which rolls up or rolls out the tonneau cover, a case, which is arranged at the inner side of the hatchback door. The case rotatably supports the roller. Further, the tonneau cover device may include a guide that guides movement of the tonneau cover, a link mechanism that supports the tonneau cover and moves the tonneau cover between the storage position to the extension position, and a driving unit. When the hatchback door is closed, the tonneau cover moves from the storage position to the extension position along the guide by the link mechanism driven by the driving unit.

In this structure, if the tonneau cover is located at the storage position when the hatchback door is closed, the tonneau cover moves along the guide to the extension position.

Other aspects and advantages of the present invention will become apparent from the following description, taken in conjunction with the accompanying drawings, illustrating by way of example the principles of the invention.

The invention, together with objects and advantages thereof, may best be understood by reference to the following description of the presently preferred embodiments together with the accompanying drawings.

BRIEF DESCRIPTION OF DRAWINGS

FIG. 4A is a chart showing conditions for starting extension and storage control in a first embodiment.

FIG. 4B is a chart showing conditions for starting extension and storage control in a second embodiment.

FIG. 4C is a chart showing conditions for starting extension and storage control in a third embodiment.

FIG. 5 is a flowchart showing the extension control executed by a tonneau cover control unit in the first embodiment.

DESCRIPTION OF EMBODIMENTS

First Embodiment

A tonneau cover device 60 according to a first embodiment of the present invention will now be described with reference to FIGS. 3, 4A, and 5.

Figure 3:
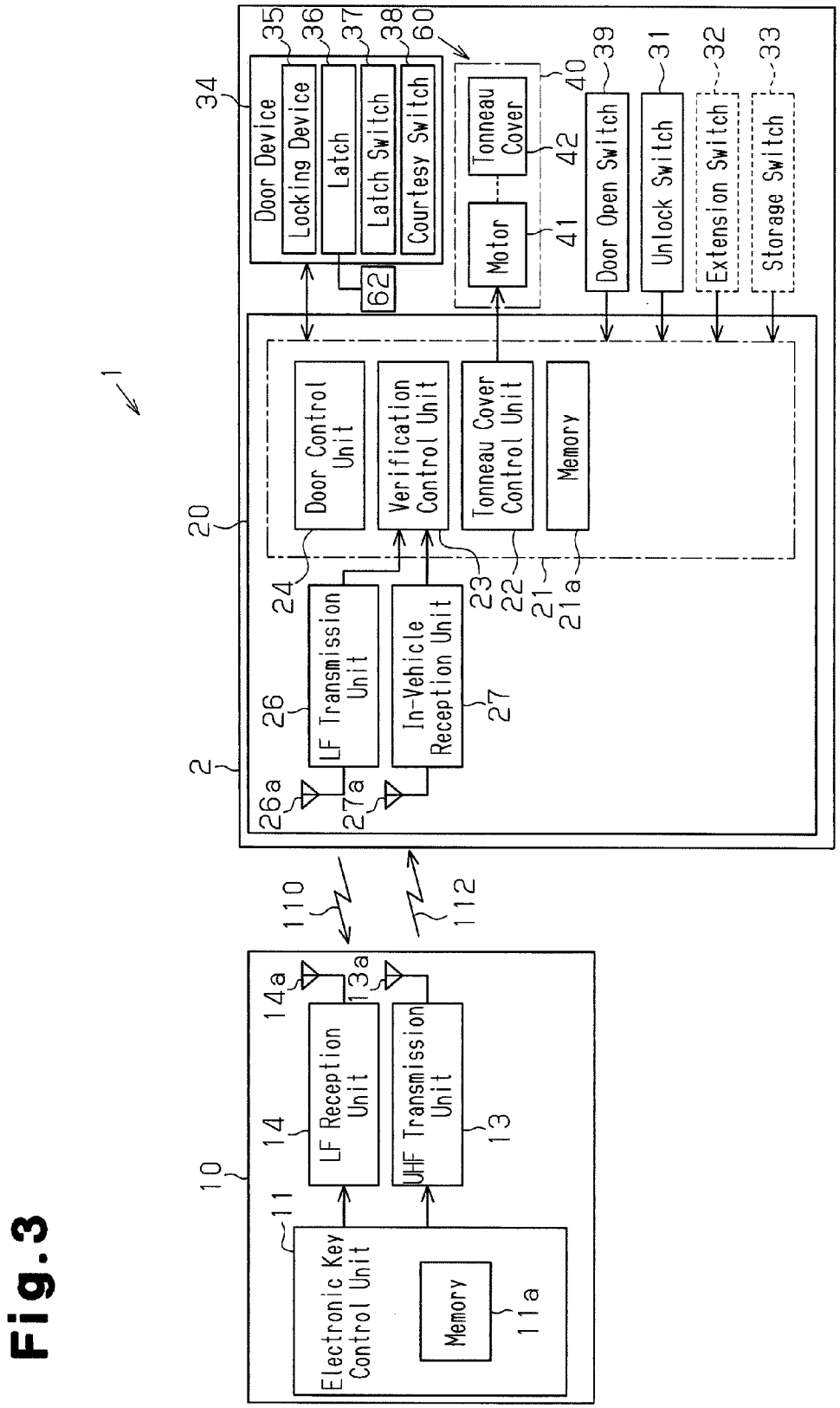
FIG. 3 is a block diagram of an electronic key system.

As shown in FIG. 3, a vehicle 2 includes an electronic key system 1. The electronic key system 1 includes an electronic key 10, which is carried by a user of the vehicle 2, and an in-vehicle device 20, which is installed in the vehicle 2. In the electronic key system 1, communication is automatically performed between the electronic key 10 and the in-vehicle device 20. When communication is established between the electronic key 10 and the in-vehicle device 20, for example, the locking and unlocking of vehicle doors are permitted. The vehicle 2 also includes the tonneau cover device 60.

Figure 1:
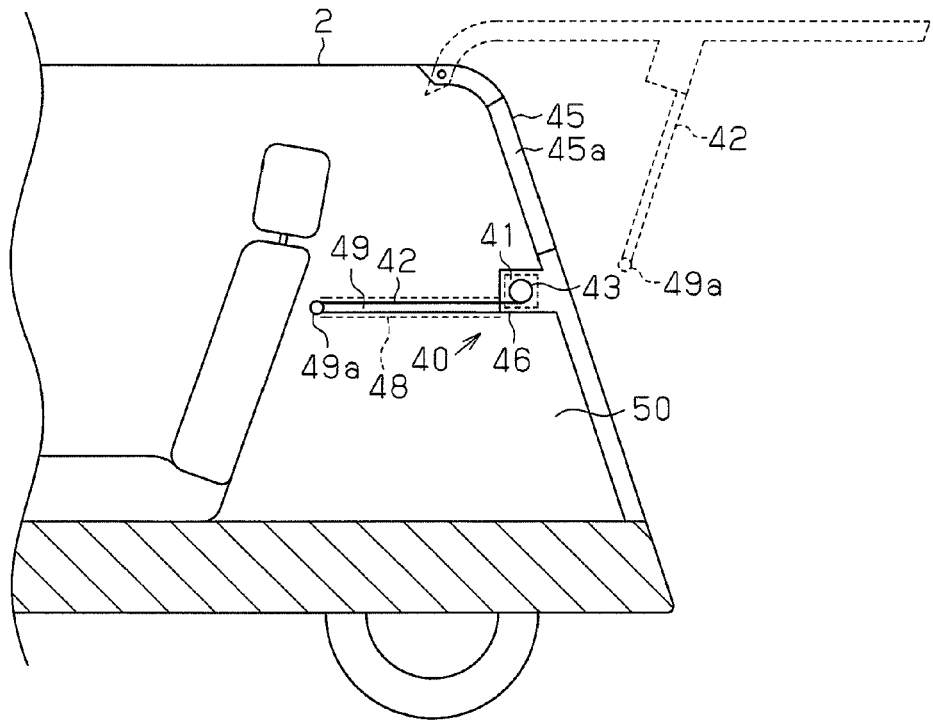
FIG. 1 is a cross-sectional view of a tonneau cover device.
Figure 2:
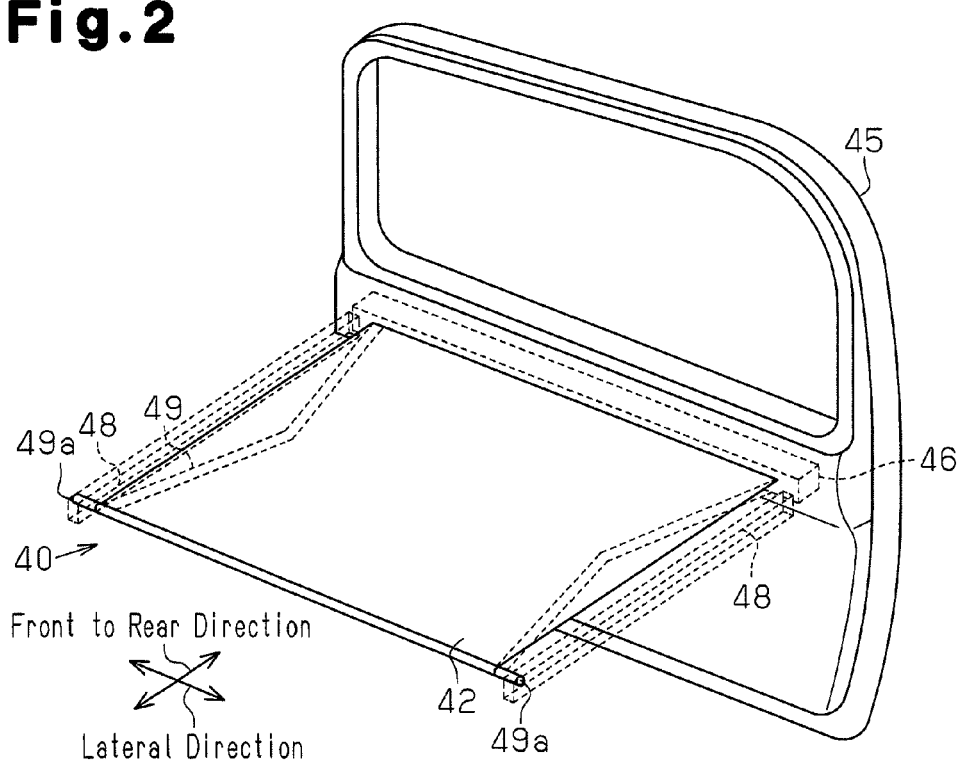
FIG. 2 is a perspective view of the tonneau cover device.

In the first embodiment, the tonneau cover device 60 includes the tonneau cover unit 40 illustrated in FIGS. 1 and 2. The tonneau cover unit 40 of the first embodiment moves the tonneau cover 42 in accordance with the opening and closing of the hatchback door 45.

Electronic Key

As shown in FIG. 3, the electronic key 10 includes an electronic key control unit 11, an ultrahigh frequency (UHF) transmission unit 13, and a low frequency (LF) reception unit 14.

The electronic key control unit 11 is formed by a computer unit and includes a non-volatile memory 11a. The memory 11a stores an ID code, which is unique to the electronic key 10.

The LF reception unit 14 receives a request signal 110, which is transmitted from the in-vehicle device on the LF band, with a reception antenna 14a. The LF reception unit 14 demodulates the request signal 110 to a pulse signal and sends the pulse signal to an electronic key control unit 11. When receiving the pulse signal (request signal 110), the electronic key control unit 11 sends a response signal 112, which includes the ID code stored in the memory 11a, to the UHF transmission unit 13. The UHF transmission unit 13 demodulates the response signal 112 and transmits the demodulated signal (response signal 112) from a transmission antenna 13a as a wireless signal on the UHF band.

In-Vehicle Device

The in-vehicle device 20 includes an in-vehicle controller 21, which is formed by a computer unit. The in-vehicle controller 21 includes a tonneau cover control unit 22, a verification control unit 23, and a door control unit 24. The control units 22 to 24 are connected to one another by a connection line (not shown) in a communicable manner.

The in-vehicle controller 21 is electrically connected to an LF transmission unit 26, an in-vehicle reception unit 27, a door device 34, unlock switches 31, the tonneau cover unit 40, and a door open switch 39.

The in-vehicle controller 21 includes a non-volatile memory 21a. The memory 21a stores an ID code that conforms to the ID code of the electronic key 10.

The LF transmission unit 26 is arranged in a door handle of each vehicle door. The in-vehicle reception unit 27 is arranged in the vehicle 2.

The verification control unit 23 generates the request signal 110 in fixed intervals and sends the request signal to the LF transmission unit 26. The LF transmission unit 26 modulates the request signal 110 and transmits the modulated signal (request signal 110) from a transmission antenna 26a to the surrounding of the vehicle 2 as a wireless signal on the LF band. When the electronic key 10 receives the request signal 110, the electronic key 10 transmits a response signal 112, which includes the ID code.

The in-vehicle reception unit 27 receives the response signal 112 with a reception antenna 27a, demodulates the response signal 112 to a pulse signal, and sends the pulse signal to the verification control unit 23. The verification control unit 23 verifies the ID code in the pulse signal (response signal 112) with the ID code stored in the memory 21a. The verification control unit 23 notifies the door control unit 24 when ID code verification is accomplished. This shifts the door control unit 24 to a state permitting locking and unlocking of the vehicle doors. In this state, when an unlock switch 31 is pushed, the door control unit 24 drives the door device 34 to switch the vehicle doors between locked and unlocked states.

The door device 34 is arranged in each vehicle door. The vehicle 2 includes a total of five vehicle doors, namely, a left front door, a right front door, a left rear door, a left right door, and the hatchback door 45. The door device 34 includes a locking device 35, a latch 36, a latch switch 37, and a courtesy switch 38. The locking device 35 switches the corresponding vehicle door between locked and unlocked states. When any one of the vehicle doors is switched between locked and unlocked states, the door control unit 24 switches the remaining vehicle doors to the same state accordingly. The courtesy switch 38 is activated when the corresponding vehicle door opens and deactivated when the corresponding vehicle door closes.

The unlock switch 31 is arranged in an outer door handle of each vehicle door. When pushed, the unlock switch 31 sends an activation signal (door unlock signal) to the in-vehicle controller 21. The unlock switch 31 is one example of a door operation unit.

The latch 36 is a fastener that mechanically engages the corresponding vehicle door to an engagement portion 62 arranged in a door frame of the vehicle body. In the first embodiment, the latches 36, which are arranged in the four doors excluding the hatchback door, that is, the left front door, the right front door, the left rear door, and the right rear door, operate in cooperation with the operation of the corresponding outer door handles. In other words, the four left and right door handles are operable to move the corresponding latches 36. The outer door handle of the hatchback door 45 is fixed to the hatchback door 45.

In each of the four left and right doors, the latch 36 is located at an engagement position when the corresponding outer door handle is not operated. The latch 36 is moved from the engagement position to a disengagement position in accordance with the operational force applied to the corresponding outer door handle.

Accordingly, when the vehicle door is closed, the corresponding latch 36 is engaged with the engagement portion 62 arranged in the door frame. When the corresponding outer door handle is operated, the latch moves to the disengagement position. This disengaged state allows the vehicle door to open.

The hatchback door 45 includes the door open switch 39. For example, the door open switch 39 is arranged next to the unlock switch 31 of the hatchback door 45. When pushed, the door open switch 39 outputs an operation signal (latch unlock signal) to the in-vehicle controller 21. When the door open switch 39 is operated in a state in which the hatchback door 45 is unlocked, for example, the door control unit 24 controls a solenoid (not shown) to move the latch 36 of the hatchback door 45 from the engagement position to the disengagement position over a certain period. This disengages the latch 36 from the door frame and allows the hatchback door 45 to open. The door open switch 39 is one example of a latch operation unit, and the operation of the door open switch 39 is one example of a pre-operation that switches the hatchback door 45 from a closed state to an open state.

The latch switch 37 detects the position of the latch 36. The latch switch 37 is deactivated when the latch 36 is located at the engagement position and activated when the latch 36 is located at the disengagement position.

The tonneau cover control unit 22 moves the tonneau cover 42 to the extension position when the hatchback door 45 closes and moves the tonneau cover 42 to the storage position when the hatchback door 45 opens.

Referring to the chart of FIG. 4A, in the first embodiment, the tonneau cover control unit 22 determines the conditions for starting the extension of the tonneau cover 42 based on the operation state of the courtesy switch 38 and the operation state of the latch switch 37. Further, the tonneau cover control unit 22 determines the conditions for starting the storage of the tonneau cover 42 based on the operation state of the latch switch 37.

As shown in the lower row of FIG. 4A, when the courtesy switch 38 is switched from a deactivated state to an activated state, the tonneau cover control unit 22 determines that the hatchback door 45 is to be opened. That is, the tonneau cover control unit 22 determines that a pre-operation for switching the hatchback door 45 from a closed state to an open state has been performed. In this case, the tonneau cover control unit 22 starts moving the tonneau cover 42 to the storage position.

As shown in the upper row of FIG. 4A, when the courtesy switch 38 is switched from an activated state to a deactivated state, as long as the latch switch 37 of the hatchback door 45 is in a deactivated state, the tonneau cover control unit 22 determines that the hatchback door 45 is in a closed state. In this case, the tonneau cover control unit 22 starts moving the tonneau cover 42 to the extension position. Here, the tonneau cover control unit 22 determines that the latch switch 37 is in a normal state.

In a state in which the latch switch 37 is functioning normally, when the vehicle door is closed, that is, when the courtesy switch 38 is switched to a deactivated state, the latch switch 37 is also deactivated. Accordingly, when the latch switch 37 is in an activated state even though the courtesy switch 38 is switched to a deactivated state, the tonneau cover control unit 22 determines that the latch switch 37 is in an abnormal state. The abnormal state refers to a state in which the latch switch 37 constantly remains in an activated state regardless of the location of the latch 36. When the tonneau cover control unit 22 determines that the latch switch 37 is in an abnormal state when the courtesy switch 38 of the hatchback door 45 is switched to a deactivated state, the tonneau cover control unit 22 keeps the tonneau cover 42 at the storage position and does not move the tonneau cover 42 to the extension position. Accordingly, the next time the hatchback door 45 is opened, the tonneau cover 42 is still located at the storage position. Thus, there is no need to place the distal members 49a on the guides 48 or return the tonneau cover 42 to the storage position. This improves convenience.

A process performed when the tonneau cover control unit 22 executes control for moving the tonneau cover 42 to the extension position will now be described with reference to the flowchart of FIG. 5. The process starts when the courtesy switch 38 of the hatchback door 45 is deactivated. First, the tonneau cover control unit 22 determines whether or not the latch switch 37 of the hatchback door 45 is deactivated (S101). When the latch switch 37 is deactivated (YES in S101), the tonneau cover control unit 22 moves the tonneau cover 42 to the extension position (S102). The process ends when the tonneau cover 42 reaches the extension position. When the latch switch 37 is activated (NO in S101), the tonneau cover control unit 22 determines that the latch switch 37 is in an abnormal state (S103). In this case, the tonneau cover control unit 22 keeps the tonneau cover 42 at the storage position and ends the process.

In the first embodiment, the tonneau cover control unit 22 is one example of a detection unit. Further, the tonneau cover control unit 22 is one example of a controller. The deactivation state of the latch switch 37 of the hatchback door 45 when the latch 36 is located at the engagement position corresponds to a first state of the vehicle. The activation state of the latch switch 37 of the hatchback door 45 when the latch 36 is located at the disengagement position corresponds to a second state of the vehicle.

The tonneau cover device 60 of the first embodiment has the advantages described below.

(1) When the hatchback door 45 closes, the courtesy switch 38 is deactivated. In this state, when the latch switch 37 is activated, the tonneau cover control unit 22 determines that the latch switch 37 is abnormal. In this case, the tonneau cover 42 does not move to the extension position and remains at the storage position. Accordingly, when the hatchback door 45 opens, the tonneau cover 42 would still be located at the storage position. In this manner, even when the latch switch 37 is in an abnormal state, there is no movement of the tonneau cover 42, which is attached to the hatchback door 45. This improves convenience.

(2) Whenever the hatchback door 45 closes, the processing shown in FIG. 5 is performed. This allows for the tonneau cover 42 to move normally when the latch switch 37 becomes normal.

Second Embodiment

A tonneau cover device 60 according to a second embodiment of the present invention will now be described with reference to FIGS. 3 and 4B. The second embodiment differs from the first embodiment in that the conditions for starting control of the tonneau cover 42 is determined based on an operation signal of the unlock switch 31 of the hatchback door 45 instead of the operation state of the latch switch 37. The structure of the second embodiment is similar to the structure of the first embodiment shown in FIG. 3. The description hereafter will focus on the differences from the first embodiment.

As mentioned above, when pushed, the unlock switch 31 sends an activation signal (door unlock signal) to the in-vehicle controller 21. When the door control unit 24 receives the activation signal from the unlock switch 31 in a state in which ID code verification is accomplished (state permitting locking and unlocking), the door control unit 24 unlocks each locked vehicle door. As shown by the lower row in FIG. 4B, when the vehicle doors are locked and the tonneau cover control unit 22 receives the activation signal from the unlock switch 31, the tonneau cover control unit 22 moves the tonneau cover 42 to the storage position. That is, when the user who is carrying the electronic key 10 operates the unlock switch 31 of the hatchback door 45, the unlocking of every one of the vehicle doors including the hatchback door 45 is performed at the same time as when the tonneau cover 42 is moved to the storage position.

As shown by the upper row in FIG. 4B, when the courtesy switch 38 is switched from an activated state to a deactivated state, the tonneau cover control unit 22 determines that the hatchback door 45 is closed as long as an activation signal is not received from the unlock switch 31. In this case, the tonneau cover control unit 22 starts to move the tonneau cover 42 to the extension position and determines that the unlock switch 31 is in a normal state.

In contrast, when the courtesy switch 38 is switched from an activated state to a deactivated state and an activation signal is received from the unlock switch 31, the tonneau cover control unit 22 determines that the unlock switch 31 is in an abnormal state. In this case, the tonneau cover control unit 22 keeps the tonneau cover 42 at the storage position and does not move the tonneau cover 42 to the extension position. Accordingly, the next time the hatchback door 45 is opened, the tonneau cover 42 is still located at the storage position. This improves convenience in the same manner as the first embodiment.

In the second embodiment, the tonneau cover control unit 22 is one example of a detection unit. Further, the tonneau cover control unit 22 is one example of a controller. Operation of the unlock switch 31, which serves as a door operation unit, is one example of a pre-operation that switches the hatchback door 45 from a closed state to an open state. In this case, the door operation unit is not limited to the unlock switch 31 of the hatchback door 45 and may be the unlock switch 31 of another vehicle door. This is because when the unlock switch 31 of another vehicle door is operated, all of the vehicle doors including the hatchback door 45 are unlocked. In the second embodiment, a state in which the tonneau cover control unit 22 does not receive an activation signal, which serves as a door unlock signal, from the unlock switch 31 corresponds to a first state of the vehicle. A state in which the tonneau cover control unit 22 receives an activation from the unlock switch 31 corresponds to a second state of the vehicle.

The tonneau cover device 60 of the second embodiment has the advantages described below.

(3) When the courtesy switch 38 switches to a deactivated state and the tonneau cover control unit 22 receives an activation signal from the unlock switch 31, the tonneau cover control unit 22 determines that the unlock switch 31 is in an abnormal state. In this case, there is a high probability that the activation signal is being transmitted from the unlock switch 31 regardless of whether or not it is operated by the user. In this case, the tonneau cover control unit 22 determines that the conditions for extending the tonneau cover 42 are not satisfied and keeps the tonneau cover 42 at the storage position. Thus, the tonneau cover 42 is not located at the extension position when the hatchback door 45 opens.

(4) When the vehicle doors are in a locked state, operation of the unlock switch 31 of the hatchback door 45 starts the storage of the tonneau cover 42. Accordingly, in comparison with the first embodiment that performs determinations based on the latch switch 37, the storage of the tonneau cover 42 is completed with further promptness.

Third Embodiment

A tonneau cover device 60 according to a third embodiment of the present invention will now be described with reference to FIGS. 4C and 6. The third embodiment differs from the first embodiment in the structure of the electronic key system 1 (wireless key system). The structure of the third embodiment is similar to the structure of the first embodiment shown in FIG. 3. The description hereafter will focus on the differences from the first embodiment.

Figure 6:
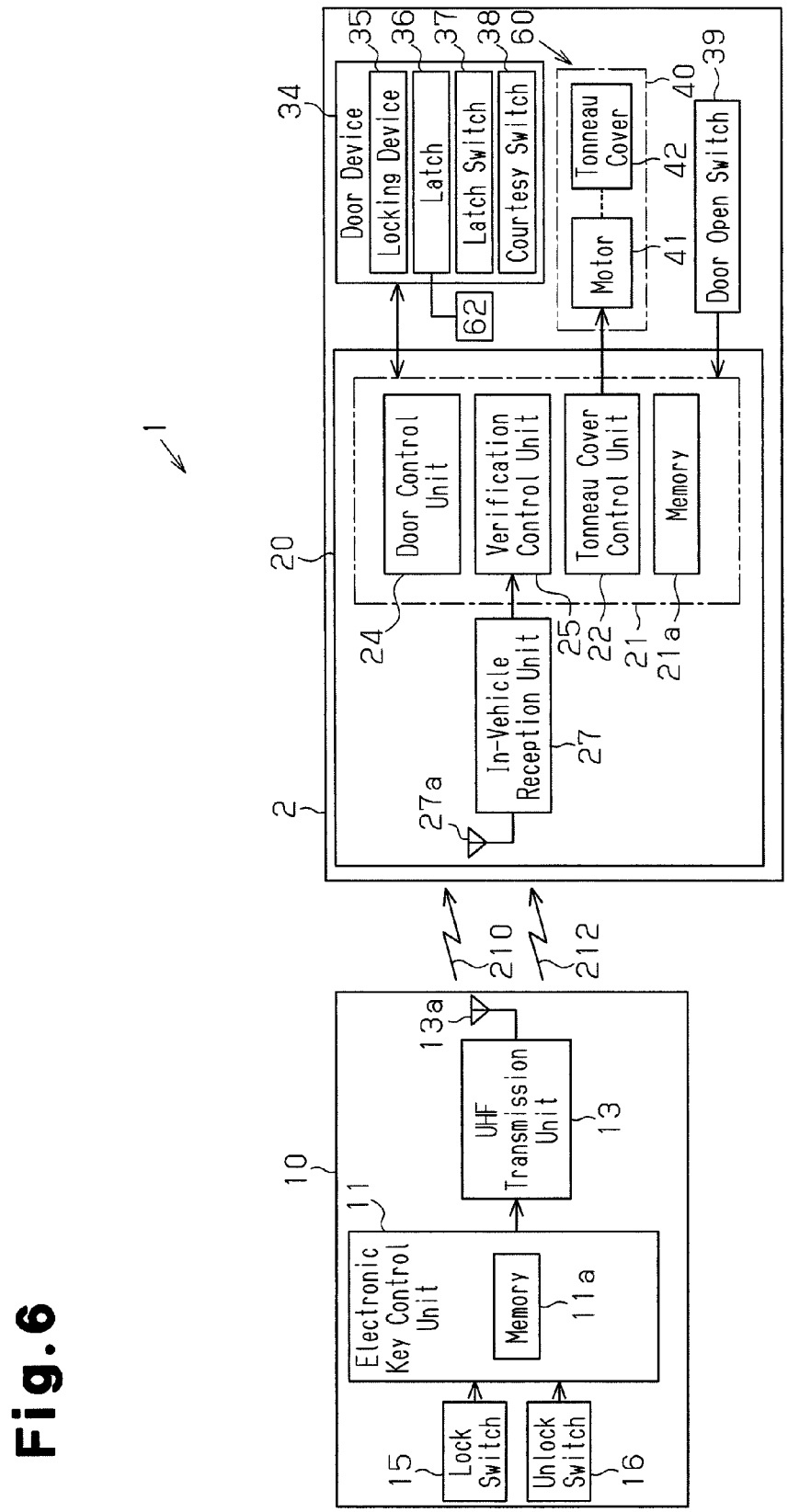
FIG. 6 is a block diagram of an electronic key system (wireless key system) in the third embodiment.

Referring to FIG. 6, in the third embodiment, the LF reception unit 14, the LF transmission unit 26, and the unlock switches 31 are omitted.

The electronic key 10 includes a lock switch 15, which is operated when locking every one of the vehicle doors including the hatchback door 45, and an unlock switch 16, which is operated when unlocking every one of the vehicle doors. The lock switch 15 and the unlock switch 16 each send an operation signal, when pushed, to the electronic key control unit 11.

When the lock switch 15 is pushed, the electronic key control unit 11 sends a lock request signal 210, which includes the ID code stored in the memory 11a, to the UHF transmission unit 13. The lock request signal 210 is a signal that requests the locking of the vehicle doors. The UHF transmission unit 13 modulates the lock request signal 210 and transmits the modulated signal (lock request signal 210) from the transmission antenna 13a as a wireless signal on the UHF band.

When the unlock switch 16 is pushed, the electronic key control unit 11 sends an unlock request signal 212, which includes the ID code stored in the memory 11a, to the UHF transmission unit 13. The unlock request signal 212 is a signal that requests the unlocking of the vehicle doors. The UHF transmission unit 13 modulates the unlock request signal 212 and transmits the modulated signal (unlock request signal 212) from the transmission antenna 13a as a wireless signal on the UHF band.

The in-vehicle reception unit 27 demodulates the lock request signal 210 or the unlock request signal 212 received by the reception antenna 27a and sends the demodulated signal to the in-vehicle controller 21.

When the in-vehicle controller 21 receives the unlock request signal 212, the verification control unit 23 verifies the ID code, which is included in the unlock request signal 212, with the ID code stored in the memory 21a to perform ID code verification. When ID code verification is accomplished, the door control unit 24 drives each door device 34 (locking device 35) and unlocks each vehicle door. In this state, the tonneau cover control unit 22 moves the tonneau cover 42 to the storage position since there is a probability that the hatchback door 45 may be opened. Thus, in the same manner as the second embodiment, the unlocking of all of the vehicle doors including the hatchback door 45 is performed at the same time as when the tonneau cover 42 is moved to the storage position.

When the in-vehicle controller 21 receives the lock request signal 210, the verification control unit 23 verifies the ID code, which is included in the lock request signal 210, with the ID code stored in the memory 21a to perform ID code verification. When ID code verification is accomplished, the door control unit 24 drives each door device 34 (locking device 35) and locks each vehicle door.

The conditions for starting extension in the third embodiment will now be described. As shown in the upper row of FIG. 4C, when the courtesy switch 38 is switched from an activated state to a deactivated state, as long as the unlock request signal 212 is not received, the tonneau cover control unit 22 determines that the hatchback door 45 is in a closed state. In this case, the tonneau cover control unit 22 starts moving the tonneau cover 42 to the extension position. Here, the tonneau cover control unit 22 determines that the latch switch 37 is in a normal state. The electronic key 10 is in an abnormal state when the transmission of the unlock request signal 212 is repeated even though the unlock switch 16 is not operated.

More specifically, when the courtesy switch 38 is switched from an activated state to a deactivated state and the tonneau cover control unit 22 receives the unlock request signal 212, the tonneau cover control unit 22 determines that the electronic key 10 is in an abnormal state. In this case, the tonneau cover control unit 22 does not move the tonneau cover to the extension position and keeps the tonneau cover 42 at the storage position. Accordingly, the next time the hatchback door 45 is opened, the tonneau cover 42 is still located at the storage position. This improves convenience in the same manner as the first embodiment.

In the third embodiment, the tonneau cover control unit 22 is one example of a detection unit. Further, the tonneau cover control unit 22 is one example of a controller. Further, operation of the unlock switch 16 of the electronic key 10 is one example of a pre-operation for switching the hatchback door 45 from a closed state to an open state. A state in which the tonneau cover control unit 22 does not receive the unlock request signal 212 corresponds to a first state of the vehicle. A state in which the tonneau cover control unit 22 receives the unlock request signal 212 corresponds to a second state of the vehicle.

The tonneau cover device 60 of the third embodiment has the following advantage.

(5) When the hatchback door 45 closes and the tonneau cover control unit 22 receives the unlock request signal 212, the tonneau cover control unit 22 determines that the electronic key 10 is in an abnormal state and keeps the tonneau cover 42 at the storage position. In this case, there is a high probability that the unlock request signal 212 is being repetitively transmitted from the electronic key 10 even though the unlock switch 16 is not operated. Accordingly, the next time the hatchback door 45 is opened, the tonneau cover 42 is not located at the extension position.

Fourth Embodiment

A tonneau cover device 60 according to a fourth embodiment of the present invention will now be described with reference to FIG. 3. The fourth embodiment differs from the first embodiment in that a tonneau cover switch is arranged in the vehicle to move the tonneau cover 42 between the extension position and the storage position. The structure of the fourth embodiment is similar to the structure of the first embodiment shown in FIG. 3. The description hereafter will focus on the differences from the first embodiment.

As shown by the broken lines in FIG. 3, an extension switch 32 and a storage switch 33 are arranged in the vehicle, for example, near the driver seat. The extension switch 32 and the storage switch 33 each output an operation signal, when pushed, to the in-vehicle controller 21.

When the tonneau cover control unit 22 receives an operation signal from the storage switch 33, the tonneau cover control unit 22 moves the tonneau cover 42 to the storage position.

When the tonneau cover control unit 22 receives an operation signal from the extension switch 32, the tonneau cover control unit 22 starts the control for extending the tonneau cover 42 that is illustrated in FIG. 4A. More specifically, when the extension switch 32 is operated, the tonneau cover control unit 22 moves the tonneau cover 42 to the extension position as long as the courtesy switch 38 detects that the hatchback door 45 is closed and the latch switch 37 is deactivated. If the latch switch 37 is activated when the courtesy switch 38 detects that the hatchback door 45 is closed, the tonneau cover control unit 22 determines that the latch switch 37 is in an abnormal state. Thus, the tonneau cover control unit 22 does not move the tonneau cover 42 to the extension position and keeps the tonneau cover 42 at the storage position.

When the extension switch 32 is operated, if the courtesy switch 38 detects that the hatchback door 45 is open, the tonneau cover control unit 22 does not move the tonneau cover 42 to the extension position and keeps the tonneau cover 42 at the storage position. This is because the tonneau cover 42 should not be extended when the hatchback door 45 is open.

The tonneau cover device 60 of the fourth embodiment has the following advantage.

(6) Operation of the extension switch 32 or the storage switch 33 controls the movement of the tonneau cover 42. In this structure, even when the latch switch 37 is in an abnormal state, the tonneau cover 42 would not be located at the extension position when the hatchback door 45 opens.

It should be apparent to those skilled in the art that the present invention may be embodied in many other specific forms without departing from the scope of the invention. Particularly, it should be understood that the present invention may be embodied in the following forms.

In the first, second, and fourth embodiments, a touch sensor may be arranged on the outer door handle of each vehicle door. The touch sensor is activated when touched by the user. When the in-vehicle controller 21 (door control unit 24) determines that the touch sensor is activated in a state in which locking and unlocking are permitted, the in-vehicle controller 21 unlocks the vehicle doors. The extension and storage control of the tonneau cover 42 may be based on the state of the touch sensor instead of an activation signal from the unlock switch 31 of the hatchback door 45 in the second embodiment. Accordingly, in the same manner as the above embodiments, even when the touch sensor is in an abnormal state, the tonneau cover 42 would not be located at the extension position when the hatchback door 45 opens. In this structure, the touch sensor is one example of a door operation unit.

In the above embodiments, the tonneau cover 42 is a soft sheet of a fabric or the like. However, the tonneau cover 42 may be hard and include a plurality of separate plates. In this case, a link mechanism joins the plates. Such a tonneau cover folds and stacks the plates when at the storage position. When spreading out the tonneau cover from the storage position to the extension position, the plates lie along the same plane.

In the above embodiments, the hatchback door 45 includes the door open switch 39. However, in the same manner as the four left and right vehicle doors, the hatchback door 45 may include an outer door handle that allows for manual operation of the latch 36. In this case, the door open switch 39 may be omitted, and the outer door handle of the hatchback door 45 functions as a latch operation unit.

In the first embodiment, the tonneau cover 42 starts moving to the storage position when the door open switch 39 is operated and the latch 36 of the hatchback door 45 moves to the disengagement position. Instead, the movement of the tonneau cover 42 to the storage position may start when the latch 36 of one of the four left and right doors moves to the disengagement position.

The structure of the fourth embodiment may be applied to the second and third embodiments. For example, when applied to the second embodiment, instead of the latch switch 37 of the fourth embodiment, an activation signal from the unlock switch 31 is used to determine whether or not to start extending the tonneau cover 42.

In the fourth embodiment, the tonneau cover switch includes the extension switch 32 and the storage switch 33 but may be formed by a single switch. In this case, whenever the switch is operated, the tonneau cover 42 moves between the extension position and the storage position.

In the above embodiments, the tonneau cover control unit 22 is included in the in-vehicle controller 21. However, the tonneau cover control unit 22 may be discrete from the in-vehicle controller 21.

In the fourth embodiment, when movement of the tonneau cover 42 to the extension position is restricted, the tonneau cover control unit 22 may ignore operation of the extension switch 32.

In the above embodiments, the tonneau cover control unit 22, the door control unit 24, and the verification control unit 23 are functionally separated. However, two or more of these control units may be functionally combined. Alternatively, the function of each control unit may be further finely divided.

The present examples and embodiments are to be considered as illustrative and not restrictive, and the invention is not to be limited to the details given herein, but may be modified within the scope and equivalence of the appended claims.

The invention claimed is:

1. A tonneau cover device including a tonneau cover coupled to an inner side of a hatchback door of a vehicle, wherein the tonneau cover device electrically moves the tonneau cover between an extension position, at which the tonneau cover conceals a cargo compartment, and a storage position, at which the tonneau cover is separated from the cargo compartment, and wherein the vehicle includes a courtesy switch that detects opening and closing of the hatchback door, the tonneau cover device comprising:
 a detector configured to
  detect that the vehicle is in a first state upon a determination that a pre-operation, for switching the hatchback door from a closed state to an open state, has not been performed, and
  detect that the vehicle is in a second state upon a determination that the pre-operation has been performed; and
 a controller configured to
  determine whether the vehicle is in the first state or in the second state when the courtesy switch is switched from an activated state, that corresponds to the open state of the hatchback door, to a deactivated state that corresponds to the closed state of the hatchback door,
  permit movement of the tonneau cover from the storage position to the extension position as long as the vehicle is in the first state, when the courtesy switch is switched from the activated state to the deactivated state and
  restrict movement of the tonneau cover from the storage position to the extension position when the vehicle is in the second state even when the courtesy switch is switched from the activated state to the deactivated state.

2. The tonneau cover device according to claim 1, wherein: the vehicle includes
 a latch arranged in the hatchback door, wherein the latch is engaged with a door frame to close the hatchback door,
 a latch operator arranged at an outer side of the hatchback door, wherein the latch operator is operated to shift the latch from an engagement position to a disengagement position, the latch is engaged with the door frame at the engagement position, and the latch is disengaged from the door frame at the disengagement position thereby allowing for the hatchback door to open, and
 a latch switch that detects whether the latch is located at the engagement position or at the disengagement position;
the pre-operation is an operation of the latch operator; and
the detector is configured to
 detect that the vehicle is in the first state when the latch switch detects that the latch is located at the engagement position, and
 detect that the vehicle is in the second state when the latch switch detects that the latch is located at the disengagement position.

3. The tonneau cover device according to claim 1, wherein: the vehicle includes
 a door operator arranged outside the vehicle, and
 a door controller that is configured to unlock a vehicle door upon a determination that a wireless signal transmitted from an electronic key carried by a user is valid and upon a determination that the door operator has been operated;
the pre-operation is an operation of the door operator that requests unlocking of the vehicle door; and
the detector is configured to detect that the vehicle is in the second state when the detector receives a door unlock signal from the door operator.

4. The tonneau cover device according to claim 1, wherein:
the vehicle includes a door controller that is configured to unlock a vehicle door when receiving an unlock request signal transmitted from an electronic key carried by a user;
the pre-operation is an operation of the electronic key for transmitting the unlock request signal; and
the detector is configured to detect that the vehicle is in the second state when the detector receives the unlock request signal from the electronic key.

5. The tonneau cover device according to claim 1 further comprising a tonneau cover switch arranged in the vehicle and operated when moving the tonneau cover between the storage position and the extension position, wherein
 the controller is configured to
  move the tonneau cover from the storage position to the extension position when the tonneau cover switch is operated while the tonneau cover is located at the storage position, the courtesy switch detects that the hatchback door is in the closed state, and the detector detects that the vehicle is in the first state, and
  keep the tonneau cover at the storage position when the tonneau cover switch is operated while the tonneau cover is located at the storage position, the courtesy switch detects that the hatchback door is in the closed state, and the detector detects that the vehicle is in the second state.

6. The tonneau cover device according to claim 1, wherein when the detector detects that the vehicle has switched from the first state to the second state, the controller is configured to determine that the hatchback door will be open and to move the tonneau cover from the extension position to the storage position.

7. The tonneau cover device according to claim 1, further comprising:
 a roller that rolls up or rolls out the tonneau cover;
 a case arranged at the inner side of the hatchback door, wherein the case rotatably supports the roller;
 a guide that guides movement of the tonneau cover;
 a link mechanism that supports the tonneau cover and moves the tonneau cover between the storage position and the extension position; and a driver, wherein when the hatchback door is closed, the tonneau cover moves from the storage position to the extension position along the guide by the link mechanism driven by the driver.

\* \* \* \* \*